US012711977B2

(12) United States Patent
Lindrup et al.

(10) Patent No.: US 12,711,977 B2
(45) Date of Patent: Aug. 18, 2026

(54) METHOD OF OPERATING AN AUDIO DEVICE SYSTEM AND AN AUDIO DEVICE SYSTEM

(71) Applicant: Widex A/S, Lynge (DK)

(72) Inventors: Rasmus Malik Hoeegh Lindrup, Berkeley, CA (US); Jens Brehm Bagger Nielsen, Fredensborg (DK)

(73) Assignee: WIDEX A/S, Lynge (DK)

( * ) Notice: Subject to any disclaimer, the term of this patent is extended or adjusted under 35 U.S.C. 154(b) by 139 days.

(21) Appl. No.: 18/719,087

(22) PCT Filed: Dec. 13, 2022

(86) PCT No.: PCT/EP2022/085562
§ 371 (c)(1),
(2) Date: Jun. 12, 2024

(87) PCT Pub. No.: WO2023/110836
PCT Pub. Date: Jun. 22, 2023

(65) Prior Publication Data

US 2025/0069613 A1 Feb. 27, 2025

(30) Foreign Application Priority Data

Dec. 13, 2021 (DK) .............................. PA202101187

(51) Int. Cl.

| | |
|---|---|
| ***G10L 21/00*** | (2013.01) |
| ***G10L 15/18*** | (2013.01) |
| ***G10L 21/0216*** | (2013.01) |
| ***G10L 21/0364*** | (2013.01) |
| ***G10L 25/00*** | (2013.01) |
| ***G10L 25/30*** | (2013.01) |

(52) U.S. Cl.
CPC ...... *G10L 21/0216* (2013.01); *G10L 15/1815* (2013.01); *G10L 21/0364* (2013.01); *G10L 25/30* (2013.01); *G10L 2021/02166* (2013.01)

(58) Field of Classification Search
None
See application file for complete search history.

(56) References Cited

U.S. PATENT DOCUMENTS 8,612,217 B2 * 12/2013 Zhang .................... H04R 3/005 704/226
9,668,066 B1 5/2017 Betts et al.
9,992,586 B2 6/2018 Nielsen
(Continued)

FOREIGN PATENT DOCUMENTS

EP 3624465 A1 3/2020
WO 2017/218492 A1 12/2017
(Continued)

OTHER PUBLICATIONS

DeLiang Wang, "Time-Frequency Masking for Speech Separation and Its Potential for Hearing Aid Design", Trends in Amplification, Dec. 2008, vol. 12, No. 4, pp. 332-353.
(Continued)

*Primary Examiner* — Satwant K Singh
(74) *Attorney, Agent, or Firm* — Sughrue Mion, PLLC

(57) ABSTRACT

A method of operating an audio device system in order to provide at least one of improved noise reduction and speech intelligibility and an audio device system adapted to carry out the method.

13 Claims, 2 Drawing Sheets

(56) References Cited

U.S. PATENT DOCUMENTS

| | | | | |
|---|---|---|---|---|
| 10,349,189 | B2 | 7/2019 | Kamkar-Parsi et al. | |
| 10,638,239 | B2 | 4/2020 | Kamkar-Parsi et al. | |
| 2001/0002465 | A1* | 5/2001 | Delaunay | G10L 15/19 704/E15.021 |
| 2009/0030552 | A1* | 1/2009 | Nakadai | G10L 21/028 704/275 |
| 2015/0095026 | A1* | 4/2015 | Bisani | H04R 3/005 704/232 |
| 2016/0267925 | A1 | 9/2016 | Nomura | |
| 2019/0066710 | A1* | 2/2019 | Bryan | G10L 21/0364 |
| 2019/0156847 | A1* | 5/2019 | Bryan | G10L 21/0232 |
| 2021/0142792 | A1* | 5/2021 | Wantland | G10L 15/30 |

FOREIGN PATENT DOCUMENTS

| | | | |
|---|---|---|---|
| WO | 2020/035180 | A1 | 2/2020 |
| WO | 2020/152324 | A1 | 7/2020 |
| WO | 2021/237368 | A1 | 12/2021 |

OTHER PUBLICATIONS

Yi Luo, et al., "Conv-TasNet: Surpassing Ideal Time-Frequency Magnitude Masking for Speech Separation", IEEE/ACM Transactions on Audio, Speech, and Language Processing, May 2019 (12 pages).

Karen Dijkstra, et al., "Exploiting Electrophysiological Measures of Semantic Processing for Auditory Attention Decoding", bio Rxiv, Apr. 18, 2020 (14 pages).

Marlies Gillis, et al., "Neural markers of speech comprehension: measuring EEG tracking of linguistic speech representations, controlling the speech acoustics", bioRxiv, Aug. 6, 2021 (39 pages).

Michael P. Broderick, et al., "Electrophysiological Correlates of Semantic Dissimilarity Reflect the Comprehension of Natural, Narrative Speech", Current Biology, 2018, vol. 28, 1-7 (8 pages).

International Search Report of PCT/EP2022/085562 dated Feb. 27, 2023 [PCT/ISA/210].

Written Opinion of PCT/EP2022/085562 dated Feb. 27, 2023 [PCT/ISA/237].

1st Technical Examination of PA202101187 dated Jul. 22, 2022.

* cited by examiner

METHOD OF OPERATING AN AUDIO DEVICE SYSTEM AND AN AUDIO DEVICE SYSTEM

CROSS REFERENCE TO RELATED APPLICATIONS

This application is a National Stage of International Application No. PCT/EP2022/085562 filed on Dec. 13, 2022, claiming priority based on Danish Patent Application No. PA202101187 filed on Dec. 13, 2021.

The present invention related to a method of operating an audio device system. The present invention also related to an audio device system adapted to carry out said method.

BACKGROUND OF THE INVENTION

An audio device system may comprise one or two audio devices. In this application, an audio device should be understood as a small, battery-powered, microelectronic device designed to be worn in or at an ear of a user. The audio device generally comprises an energy source such as a battery or a fuel cell, at least one microphone, a microelectronic circuit comprising a digital signal processor, and an acoustic output transducer. The audio device is enclosed in a casing suitable for fitting in or at (such as behind) a human ear.

If the audio device furthermore is capable of amplifying an ambient sound signal in order to alleviate a hearing deficit the audio device may be considered a personal sound amplification product or a hearing aid.

According to variations the mechanical design of an audio device may resemble those of hearing aids and as such traditional hearing aid terminology may be used to describe various mechanical implementations of audio devices that are not hearing aids. As the name suggests, Behind-The-Ear (BTE) hearing aids are worn behind the ear. To be more precise, an electronics unit comprising a housing containing the major electronics parts thereof is worn behind the ear. An earpiece for emitting sound to the hearing aid user is worn in the ear, e.g. in the concha or the ear canal. In a traditional BTE hearing aid, a sound tube is used to convey sound from the output transducer, which in hearing aid terminology is normally referred to as the receiver, located in the housing of the electronics unit and to the ear canal. In more recent types of hearing aids, a conducting member comprising electrical conductors conveys an electric signal from the housing and to a receiver placed in the earpiece in the ear. Such hearing aids are commonly referred to as Receiver-In-The-Ear (RITE) hearing aids. In a specific type of RITE hearing aids the receiver is placed inside the ear canal. This category is sometimes referred to as Receiver-In-Canal (RIC) hearing aids. In-The-Ear (ITE) hearing aids are designed for arrangement in the ear, normally in the funnel-shaped outer part of the ear canal. In a specific type of ITE hearing aids the hearing aid is placed substantially inside the ear canal. This category is sometimes referred to as Completely-In-Canal (CIC) hearing aids or Invisible-In-Canal (IIC). This type of hearing aid requires an especially compact design in order to allow it to be arranged in the ear canal, while accommodating the components necessary for operation of the hearing aid.

Generally, a hearing aid system according to the invention is understood as meaning any device which provides an output signal that can be perceived as an acoustic signal by a user or contributes to providing such an output signal, and which has means which are customized to compensate for an individual hearing loss of the user or contribute to compensating for the hearing loss of the user.

Within the present context an audio device system may comprise a single audio device (a so called monaural audio device system) or comprise two audio devices, one for each ear of the user (a so called binaural audio device system). Furthermore, the audio device system may comprise at least one additional device (which in the following may also be denoted an external device despite that it is part of the audio device system), such as a smart phone or some other computing device having software applications adapted to interact with other devices of the audio device system. However, the audio device system may also include a remote microphone system (which generally can also be considered a computing device) comprising additional microphones and/or may even include a remote server providing abundant processing resources and generally these additional devices will also include link means adapted to operationally connect to the various other devices of the audio device system.

Despite the advantages that contemporary audio device—and especially hearing aid—systems provide, some users may still experience hearing situations that are difficult. A critical element when seeking to alleviate such difficulties is the audio device systems ability to suppress noise.

One particularly difficult hearing situation is the so called cocktail party situation where multiple speakers are present at the same time and typically positioned close together.

It has therefore been suggested to provide separation of speakers in order to suppress undesired speakers. Traditionally this has been provided using e.g. various beamforming techniques and more recently speaker separation (which in the following may also be denoted source separation) has been demonstrated based on specifically trained neural networks. One example of such a system is described in the paper: "TaSNet: Time-Domain Audio Separation Network for Real-Time, Single-Channel Speech Separation", by Yi Luo, N. Mesgarani, 2018 IEEE International Conference on Acoustics, Speech and Signal Processing (ICASSP). Herein it is suggested to model the signal in the time-domain using an encoder-decoder framework and perform the source separation on nonnegative encoder outputs, whereby the separation problem is reduced to estimation of source masks on encoder outputs that are then synthesized by the decoder.

Thus with such a system a mixed audio signal comprising a plurality of sound sources (typically speakers, but not all the separated sound sources need to be speakers) can be separated into a plurality of separated sound source signals. However, in order to benefit from having these separated sound source signals it needs to be determined which sound source signals to suppress or even discard in order to improve a user's ability to understand what is being said by at least one selected (and consequently not suppressed or discarded) speaker.

Various methods for determining and subsequently select the sound source signal that represents the desired speaker have therefore been suggested. One such method applies beamforming to automatically select the (sound source signal representing) speaker that is in front of the user. Thus the user can select the desired speaker simply by turning towards her.

However, according to an alternative embodiment the audio device system comprises a personal computing device adapted to provide a GUI illustrating a present plurality of sound sources and enabling the user to select which one(s) to focus on.

While such methods make good sense in many situations, it may be less than optimal in some situations, e.g. where the user is participating in a group conversation with e.g. two speakers positioned to respective the left and right side of the user. In response to such situations it has therefore been suggested to track the users eye movements and compare them with the relative position of the speakers and based hereon select the desired speaker while also enabling fast changing of the speaker being selected as the desired speaker. According to a specific embodiment the eye tracking is carried out using a head mounted camera (e.g. integrated in a pair of glasses). However, such a system is disadvantageous with respect to the added cost and decreased wearing comfort resulting from implementing an eye tracker.

Systems that may suffer from similar drawbacks as the eye tracker system mentioned above are systems having Electroencephalography (EEG) sensors that may enable automatic selection of the desired speaker by comparing (e.g. by tracking similar waveforms) a measured EEG signal with the available sound source signals and choosing the desired speaker by identifying the sound source signal having the highest similarity with the measured EEG signal. According to an alternative embodiment the measured EEG signal can also be used to track eye movements.

Thus all known methods for sound source separation and the subsequent selection of the desired speaker is less than optimal at least with respect to cost and usability.

It is therefore a feature of the present invention to provide a method of operating an audio device system that provides improved noise reduction.

It is another feature of the present invention to provide an audio device system adapted to provide such a method of operating an audio device system.

It is yet another feature of the present invention to provide a non-transitory computer readable medium carrying instructions which, when executed by a computer, cause said method to be performed.

SUMMARY OF THE INVENTION

The invention is set out in the appended set of claims.

BRIEF DESCRIPTION OF THE DRAWINGS

By way of example, there is shown and described a preferred embodiment of this invention. As will be realized, the invention is capable of other embodiments, and its several details are capable of modification in various, obvious aspects all without departing from the invention. Accordingly, the drawings and descriptions will be regarded as illustrative in nature and not as restrictive. In the drawings.

DETAILED DESCRIPTION

In the present context the term "audio signal" will generally be construed to mean an electrical (analog or digital) signal representing a sound. A beamformed signal (either monaural or binaural) is one example of such an electrical signal representing a sound. Another example is an electrical signal wirelessly streamed to the audio device system. However, the audio signal may also be internally generated by the audio device system. More specifically the term "audio input signal" will be generally be construed to mean an electrical signal representing a sound from the sound environment, but the term "audio input signal" may also be construed to mean an electrical signal representing a beamformed audio signal. In the following a beamformed audio signal may also be denoted a signal derived from the sound environment.

Similarly, the term "audio output signal" will generally be construed to mean an electrical signal representing a sound to be output by an electrical-acoustical output transducer of an audio device of an audio device system.

Furthermore, in the present context the terms "sound source signal" and "separated sound source signal" may be used interchangeably, since both terms are used to describe signals that primarily represent a single sound source—typically in the form of a human speaker.

In a similar manner a sound source signal may or may not be specifically denoted a "latent space sound source signal" when considered in an embodiment comprising an encoder-decoder neural network.

While the term "sound source" does not represent the same as a "sound source signal" then the terms can sometimes be considered interchangeable, e.g. with respect to selecting a specific (e.g. a first) sound source signal, because in case a first sound source signal is selected then this necessarily implies that the corresponding sound source can likewise be considered selected. The terms source and sound source are also interchangeable.

It is also noted that the term "most likely" of course can be replaced by a term such as "estimated to" or another obvious variation.

Figure 1:
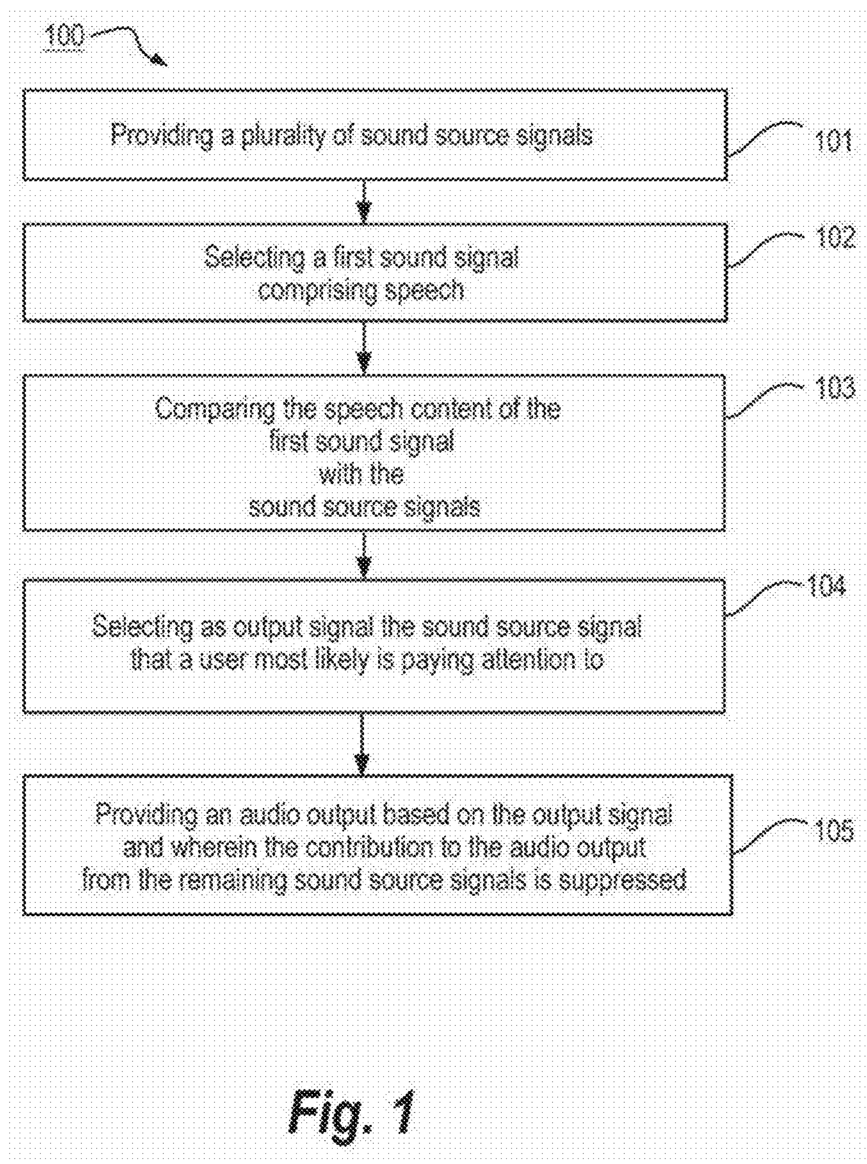
FIG. 1 illustrates highly schematically a method according to an embodiment of the invention.

FIG. 1: Method Embodiment

Reference is first given to FIG. 1, which illustrates highly schematically a flow diagram of a method 100 of operating an audio device system according to an embodiment of the invention.

1st Step: Providing a Plurality of Sound Source Signals

In a first step 101 of the method a plurality of sound source signals each representing a sound source of the present sound environment are provided.

According to the present embodiment said plurality of sound source signals are provided based on an audio input signal, that is either provided from a single acoustical-electrical input transducer or is a beamformed signal derived from at least two acoustical-electrical input transducers.

This step may be carried out using basically any sound source separation method.

According to one embodiment the method disclosed in the above mentioned paper by Yi Luo and N. Mesgarani may be used.

According to another embodiment, an improvement of the above method disclosed by the same authors in the more recent paper: Conv-TasNet: "Surpassing Ideal Time-Frequency Magnitude Masking for Speech Separation", May 2019, IEEE/ACM Transactions on Audio, Speech, and Language Processing PP (99): 1-1, may be used. Herein it is disclosed how the set of weighting functions (masks) applied to the encoder output in order to provide the source separation are found using a temporal convolutional network (TCN) consisting of stacked 1-D dilated convolutional blocks, which allows the network to model the long-term dependencies of the speech signal while maintaining a small model size.

Generally such an encoder-decoder neural network can be obtained (i.e. trained) by feeding a mixed audio signal comprising a plurality of speech signals and at least one noise signal to the neural network and subsequently train the neural network to provide only said plurality of speech signals (without the noise).

According to an embodiment the mixed audio signal may also comprise non-speech signals, such as music whereby the sound source separation is not necessarily limited to separating a plurality of speakers.

However, it is noted that according to another embodiment the sound source separation is not based on neural networks but is instead based on using a plurality of beam formers each adapted to point in a desired direction (i.e. the direction of a speaker or some other desired sound source) and each adapted to have a beam width so narrow that each primarily covers only a single sound source, such that said plurality of beam formers enables that a plurality of sound source signals are provided.

According to a more specific embodiment the method disclosed in the U.S. Pat. No. 10,349,189 B2 is used to provide the sound source separation and according to another embodiment the method disclosed in the U.S. Pat. No. 10,638,239 B2 is used.

According to an embodiment speech detection is applied in order to determine that a beam former is pointing in a desired direction by determining whether speech is detected in the beam former output signal.

2$^{nd}$ Step: Selecting a First Sound Signal

In a second step 102 of the method according to the present embodiment a first sound signal comprising speech is selected According to an embodiment a sound from a (sound) source is first detected. This can be done by detecting a sound from a source positioned in front of the user or by detecting a sound from a source that the user is looking at or by identifying the sound source signal that exhibits the highest similarity with an EEG signal of the user.

Next such a detected sound is selected as the first sound signal in response to a predetermined interaction between the user and the audio device system wherein said predetermined interaction is selected from a group comprising: making a specific head movement, tapping an audio device of the audio device system, operating an audio device control means, speaking a control word and operating a graphical user interface of the audio device system.

According to a more specific embodiment the detected sound is provided to the audio device by pointing a beamformer towards the direction of the corresponding sound source. Thus, in case the audio device system is configured to select as the first sound signal, a sound that comes from a corresponding sound source that is positioned in the direction the user is facing or the sound source is the user of the audio device system, then it is straightforward to point a beamformer in the right direction. This is also straightforward if the audio device system comprises a system capable of detecting the direction a user is looking, e.g. by incorporating a camera or some other sensor.

Thus, it is noted that for an audio device system, where the selected sound signal originates from the direction the user is facing or originates from the direction to the user's mouth, the beamformer need not be steerable, while a steerable beamformer is required for an audio device system, where the selected sound signal originates from the direction the user is looking.

However, in case of an audio device system, where the sound signal is selected based on a comparison of the provided sound source signals with an approximately simultaneously EEG signal of the user, then a beamformer is not required.

Finally, it is mentioned that for an audio device system, where the own voice is the selected sound source, then a beamformer may or may not be required because an own voice detector learned to detect the user's own voice based e.g. on spectral characteristics can be used to identify the sound source signal that belongs to the user without requiring a beamformer.

According to an embodiment a first sound signal detected (and selected) from a certain direction using a beamformer can be used to identify the corresponding sound source signal by considering the values of the cross-correlation between the beam former signal and provided plurality of sound source signals. The advantage hereof is that the SNR of the identified sound source signal typically will exceed that of the selected first sound signal. In variations the two (audio) signals may be transformed from the time domain, e.g. using a Fourier transformation, in order to carry out the signal matching in the frequency domain or by other transformations.

According to another embodiment of the present embodiment an own voice signal representing the voice of the audio device system user is detected and in response hereto the own voice signal is selected as the first sound signal, without requiring any subsequent interaction between the user and the audio device system.

This step may be carried out using basically any known method for obtaining an own voice signal representing the voice of a user of the audio device system. However, according to one embodiment the method disclosed in the patent application WO-A1-2020035180 may be used to identify the users own voice. Basically, this is obtained by determining at least one frequency dependent unbiased mean phase from a mean of an estimated inter-microphone phase difference or from a mean of a transformed estimated inter-microphone phase difference and based hereon identifying the situation that a user of the audio device system is using her voice, in response to a determination that the determined frequency dependent unbiased mean phase is within a predetermined first range.

Having this situation identified, the own voice signal may subsequently be identified as the first sound signal, among the plurality of provided sound source signals, having at least one of the highest sound pressure level, the best signal-to-noise ratio, some specific spectral characteristics and providing the highest value of a cross-correlation with the own voice signal.

However, according to another embodiment the own voice signal is provided simply as an audio input signal having been beamformed to enhance sound form the user's mouth, i.e. according to this embodiment the own voice signal need not be selected from the plurality of sound source signals.

According to other embodiments, any own voice detection method may be used to identify the situation that the user of the audio device system is using his voice and subsequently this identification can be combined with at least one of the above mentioned methods for enabling the audio device system to provide the own voice signal in response to said identification.

Generally, speaker identification is well known within the field of audio devices and many different implementations exist. One implementation comprises generating a "voice print" of data derived from a given audio signal and comparing the generated voice print to previously obtained voice prints that each are associated to a specific speaker, whereby the speaker of said given audio signal may be identified as the person associated with said previously obtained voice print that best matches said generated voice print. Generally said voice prints may comprise any data that represents the voice including e.g. Mel Frequency Cepstral Coefficients (MFCC).

According to an embodiment, detection of an own voice signal will always provide that the own voice signal is selected as the first sound signal.

Additionally, according to another embodiment any of said above mentioned predetermined interactions between the user and the audio device system will override the currently selected first sound signal and provide that the signal associated with the predetermined interaction is selected instead.

According to another embodiment, the audio device system is configured to enable the user to select between different methods for selecting the first sound signal such that e.g. one type of user interaction selects the first sound signal based one direction the user is facing and another type of user interaction selects the sound source signal from the direction the user is looking. According to another embodiment the audio device system is configurable to, at some point in time, enable only one out of a plurality of methods for selecting the first sound signal.

3$^{rd}$ Step: Comparing Speech Content

In a third step 103 of the method according to the present embodiment the speech content of the first sound signal is compared with the speech content of the provided sound source signals.

According to an embodiment this comparing step (and the subsequent fourth and fifth steps) is triggered by a detection of said first sound source signal reaching a speech ending.

Thus it is noted that within the comparison of speech content is not necessarily based on comparison of speech content from identical points in time, for reasons that will be obvious from the following disclosure.

According to one embodiment the third step 103 of the method according to the present embodiment comprises the step of using Natural Language Processing (NLP) for said comparison.

According to a more specific embodiment a numerical representation is assigned to at least some of the words comprised in the first sound signal and said plurality of provided sound source signals. This is done using a word embedding function that provides embedded words by assigning a vector of a relatively high dimensionality, say in the range of 50 to 400 to at least some of the words comprised in the considered signals. According to an embodiment the word embedding function is furthermore adapted such that the embedded words have a learnt structure representing some specific concepts such that embedded words representing "animals", such as "cat", "kitten", "dog" and "puppy", will be relatively close to each other in the multi-dimensional space of the embedded words, while these embedded words will all be relatively far from embedded words representing say "mechanical equipment", such as "hammer", "saw" and "screwdriver". According to another embodiment the word embedding function is furthermore adapted to provide that the word embedding of "cat" is related to the word embedding of "kitten" in the same manner as the word embeddings of "dog" and "puppy" are related, wherefrom it e.g. follows that the word embedding of say "puppy" can be estimated by subtracting the word embedding of "cat" from the sum of the word embeddings of "dog" and "kitten".

However, the concept of word embedding is well known and software for training and using word embeddings are known and includes e.g. "Word2vec", "GloVe" and "BERT" all of which are configured to map words into a meaningful space where the distance between the embedded words reflect the semantic similarity and all of which are available based on API's.

Having assigned a numerical representation, such as a word embedding, to at least some of the words in the considered signals a word embedding similarity measure is provided in order to estimate the similarity between each of the sound source signals and the first sound source signals.

According to a more advanced embodiment the above disclosed methods for word embeddings are carried out based on latent space sound source signals, that can be obtained from a sound source separation encoder-decoder neural network. The advantage of training an NLP model based on latent space sound source signals is that these signals represent a more compact version of the audio signals.

According to one embodiment the numerical representations of the words (i.e. the word embeddings) considered, for each of the signals to be compared, are simply added or alternatively a vector average is determined in order to provide a word embedding similarity measure for each of the signals to be compared. Subsequently a similarity metric is used to determine the sound source signal that is most similar with the first sound signal with respect to the speech content.

According to one embodiment the Cosine distance is one such similarity metric for measuring distance between multi-dimensional vectors when the magnitude of the vectors does not matter and as such should be used with a vector average of the word embeddings as input. Thus according to this embodiment the sound source signal being most similar with the first sound signal, i.e. the sound source signal having the average vector that is separated from the average vector of the first sound signal with the smallest distance is selected as the signal that the user of the audio device system is most likely paying attention to. As will be explained further below.

According to other embodiments vector metrics like Euclidean distance or Manhattan distance can be used to provide a similarity metric.

According to another embodiment the word embeddings from the first sound signal, is compared with the word embeddings for each of the sound source signals and if two word embeddings from each of the two signals to be compared are determined to be close (i.e. that some similarity metric is higher than some threshold) then this increases a similarity counter with one and hereby the sound source signal that the user is most likely to be paying attention to can be determined as the signal having the highest similarity counter score.

According to another more specific embodiment for comparing said first sound signal with the provided plurality of sound source signals a Language Model (LM) capable of predicting the probability of "next words" given the previous words is applied.

This can be carried out by assigning a numerical representation to at least one of the syntactic and semantic information comprised in the first sound signal and each of the provided plurality of sound signals and subsequently using at least one of a syntactic and semantic similarity measure to estimate the similarity between each of the sound source signals and the first sound signal.

Thus according to an embodiment a LM can predict the probability of a subsequent sentence based on a previous sentence, which the inventors have realized in the present context can be configured such that having a given sentence extracted from the first sound signal (which in the following may be denoted first sound source signal speech content), the LM can estimate for each of the sentences extracted from the provided sound source signals (which in the following may be denoted sound source speech content) the probability that the speech content of a given sound source signal is a response to the first sound signal speech content and based hereon the sound source signal comprising the speech content having the highest probability of being a response to the first sound source signal speech content will be selected as output signal.

In a similar manner the speech content from each of the sound source signals can be analyzed to find the sound source that a subsequent own voice signal most likely is a response to, whereby it can be assumed that the user of the audio device system is engaged in a conversation with the person represented by said sound source signal.

One Language model capable of carrying out the tasks above is the Natural Language API from Google. Alternatives include e.g. Amazon comprehend, Microsoft Text Analytics, Bidirectional Encoder Representations from Transformers (BERT) and Generative Pre-trained Transformer 3 (GPT-3), which can understand semantics and are able to predict meaningful words and sentence continuations.

According to an embodiment language models capable of predicting meaningful word and sentence continuations are applied whereby identification, with a high probability, of a speaker the user is paying attention to can be achieved very fast.

According to another similar embodiment, that may be used in addition to—or combined with—the previous embodiment, the speech content from each of the sound source signals can be analyzed to find another sound source signal that most likely represent a response to the considered sound source signal. If such a relation is identified it can be used to improve the probability that the user of the audio device system is not actively taking part in the conversation between the corresponding two sound sources.

However, it is of course noted that the user may be paying attention to these two sound sources but without taking active part in the conversation.

Language models are often trained and subsequently used based on text input and consequently an Automatic Speech Recognizer (ASR) is often required in order to transform the digital representation of the considered audio signals into text.

However, according to an embodiment the audio signals can be used directly as input to a language model, which obviously is advantageous if the output signal from the language model is used to provide input to the forecasting model according to the present invention.

Natural language processing is likewise typically based on text input and will consequently also often require an Automatic Speech Recognizer (ASR) in order to transform the digital representation of the considered audio signals into text.

Examples of ASR's include Google's and Assembly AI's Speech-to-Text APIs.

According to another embodiment the comparison of said first sound source signal with the other sound source signals is based on an evaluation of conversation dynamics (which in the following may also be denoted "turn taking").

According to a more specific embodiment the selection is based on an evaluation of the conversation dynamics by detecting when a selected speaker has finished speaking (which in the following may also be denoted a speech ending) and in response hereto selecting as the next selected speaker, a speaker that was not speaking when the previous speaker finished speaking and is the first to initiate speech after that point in time. This method is especially advantageous by enabling high selection speed and only requiring limited processing resources. According to an embodiment Voice Activity Detectors (that in the following may be abbreviated VADs or alternatively denoted speech detectors) are used to monitor whether speech is present in the sound source signals and based hereon determine the speaker (as represented by a separated sound source signal) that is the first to initiate speech after the previous speaker has finished speaking.

However, according to a more general embodiment the timing of speech ending for the first sound signal is determined and so is the timing of speech onset for the provided plurality of sound source signals and subsequently the sound source signals with a speech onset within a short duration after speech ending for the first sound signal is determined.

According to a more specific embodiment said short duration is between 100 and 300 milliseconds. According to a more specific embodiment the system can learn typical turn taking times for a given sound source (i.e. speaker) and consequently the range of said short duration can be narrowed in order to avoid that multiple speakers start speaking within the range.

According to another similar embodiment this is obtained by determining the amount of speech overlap (in time) between the first sound signal and the sound source signals. The more overlap in time the less likely that the user is having a conversation with the considered sound source.

4th Step: Selecting Sound Source Signal

In a fourth step 104 of the method according to the present embodiment the sound source signal that the user of the audio device system is most likely paying attention to is selected as output signal, based on the comparison carried out as disclosed above for the third step of the method.

According to one embodiment the sound source signal having the word embedding similarity measure that is most similar with the word embedding similarity measure of the first sound signal is selected as the output signal.

According to another embodiment the sound source signal having the highest score of at least one of the semantic similarity measure and the syntactic similarity measure is selected as the output signal.

According to yet another embodiment the sound source signal having a speech onset within a predetermined duration after a speech ending for the first sound signal is selected as the output signal.

According to another embodiment the sound source signal having a highest combined score is selected as output signal, wherein the combined score is obtained by combining at least some of: the word embedding similarity measure score, the semantic similarity measure, the syntactic similarity measure, a sound pressure level score reflecting the strength of the signal, a previous participant score reflecting whether the speaker representing the sound source signal has previously participated in the conversation that the user is paying attention to and having a speech onset within said predetermined duration after speech ending of the first sound signal.

It is noted that a high sound pressure level of a sound source signal is generally a good indicator of the user paying attention to that signal because the person speaking will typically try to speak louder than people close by (from the users perspective) if addressing the user.

According to a more specific embodiment the combined score is a weighted sum of individual scores, such as those mentioned above. According to an embodiment the optimum weighting of the individual scores is learnt based on user feedback. This learning of the optimized weighting can as one example be carried out using Bayesian optimization methods, e.g. as described in the U.S. Pat. No. 9,992,586 B2.

According to an embodiment the method used to select the output signal is dependent on the sound environment. Thus according to a more specific embodiment the weighting of the individuals scores for the above mentioned combined score is dependent on the sound environment. Classification of the sound environment can be carried out in different ways, all of which will be well known for the skilled person.

According to a more specific embodiment the sound environment dependent weighting of the individual scores, is the result of a learning based on user feedback.

According to another more specific embodiment the individual scores for which the user is prompted to optimize the weights is dependent on the sound environment.

According to an embodiment the selection of the number and type of individual scores to be included in the combined score for a given sound environment is at least partly based on other users feedback in similar sound environments.

According to another embodiment the selection of the number and type of individual scores to be included in the combined score for a given sound environment is at least partly based on the feedback from users with at least one of a similar hearing loss, and a similar personality profile comprising at least sex and age.

5$^{th}$ Step: Providing Audio Output

In a fifth step 105 of the method according to the present embodiment an audio output is provided based on said output signal, wherein the contribution to the audio output from the remaining sound source signals is suppressed compared to the contribution from the output signal.

According to an embodiment the contribution to the audio output from the remaining sound source signals is suppressed such that the combined level of the remaining sound source signals is in the range between 3 and 24 dB or between 6 and 18 dB below the output signal level.

According to another embodiment the user of the audio device is enabled to control the ratio between the output signal level and the combined level of the remaining sound source signals.

According to an embodiment the output signal is selected to replace the current first sound signal and subsequently the third, fourth and fifth steps are repeated. According to an embodiment this is done in response to a detection of said output signal reaching a speech ending.

Hereby, it is provided that the user of the audio device system can follow a conversation without actively taking part in it, because the audio device system is adapted to continue to track a conversation as already described above. In fact it is noted that the ability to track a conversation is not limited by the number of persons (i.e. sound sources) taking part as long as the sound source signals associated with the persons taking part are provided.

According to a more specific embodiment triggering of the third, fourth and fifth steps is carried out in response to a detection of the current first sound signal reaching a speech ending.

According to a more specific embodiment, and as already discussed above not only the speech content of the first sound signal and the sound source signals is compared, but, the other sound source signals are also compared with each other. The advantage hereof is that the probability of determining successfully the sound source signals involved in a conversation that the user is paying attention to, can be improved if it is determined with a high probability that some other sound sources are involved in another conversation because this means that these sound sources most likely are not part of the conversation that the user is paying attention to.

Figure 2:
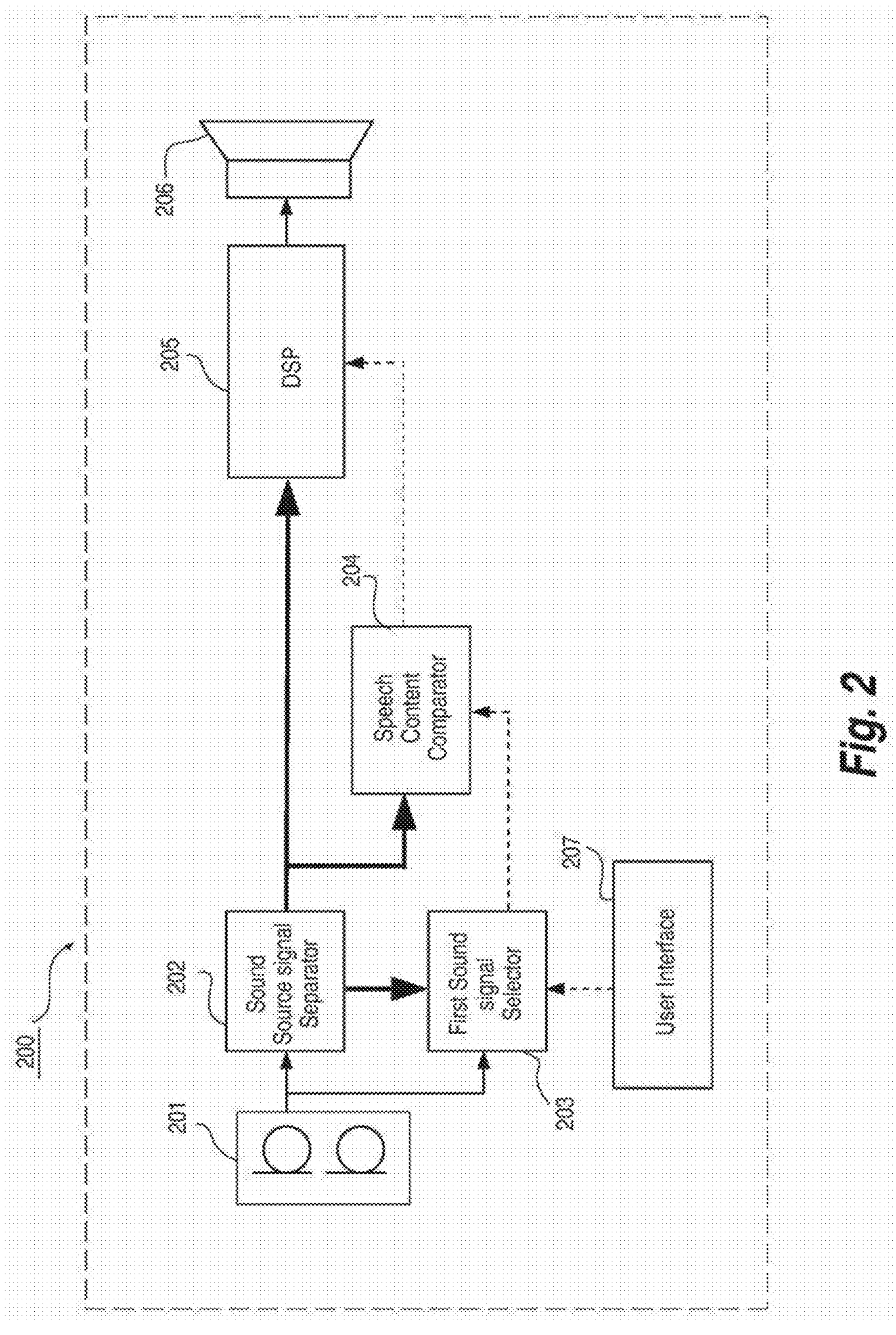
FIG. 2 illustrates highly schematically an audio device system according to an embodiment of the invention.

FIG. 2: Audio Device System Embodiment

Reference is now given to FIG. 2, which illustrates highly schematically an audio device system 200 according to an embodiment of the invention. In this simple embodiment the audio device system 200 consists of only a single audio device, but the system may additionally comprise at least one of a second audio device and an external device such as a smart phone.

The audio device system 200 comprises an acoustical-electrical input transducer block (typically comprising two microphones) 201 and an analogue-digital converter (not shown for reasons of clarity), which provides an input signal that is branched and consequently provided both to a sound source signal separator 202 and a first sound signal selector 203.

The sound source signal separator 202 provides a plurality of sound source signals based on the received input signal, as already discussed in the method embodiment this may be done using a neural network or a beamformer. The plurality of sound source signals is subsequently branched and provided both to a speech content comparator 204, to a digital sound processor 205 and to a first sound source selector 203. The bold arrow from the sound source signal separator 202 illustrates that a plurality of signals is transmitted.

The first sound signal selector 203 provides a selection of the first sound signal and identifies subsequently the sound source signal from the sound source signal separator 202 that corresponds to the selected first sound signal. This can be done in a multitude of ways as already described under the second step of the method according to FIG. 1. Thus, the first sound signal selector can be adapted to receive input from at least one of an own voice detector, a beam former, an EEG sensor and an eye-tracker. For reasons of clarity these are not shown in FIG. 2. Instead only a user interface 207 for enabling the user to select the first sound signal by providing a control signal to the first sound signal selector 203 is illustrated in FIG. 2. Thus the user interface 207 is adapted to receive information from a user of the audio device system 200 concerning a sound source (i.e. sound source signal) the user intends to pay attention to by carrying out at least one of: detecting a specific head movement of the user, detecting a specific tapping on an audio device of the audio device system, receiving an input in response to the user operating an audio device control means or operating a graphical user interface of the audio device system, detecting a control word spoken by the user and detecting the user's own voice.

Thus according to an embodiment the first sound signal selector 203 is adapted to carry out the steps of: receiving the signal originating from the direction the user is facing using a narrow beamformer, receiving an indicating from the user interface that the user now desires to focus on the specific conversation involving said signal originating from the direction the user is facing, whereby the desired first sound signal is provided and finally the first sound signal is compared with the provided plurality of sound source signals in order to identify the separated sound source signal that corresponds to the selected first sound signal, which can be done using e.g a cross-correlation measure.

However according to an alternative embodiment the first sound signal (instead of the corresponding sound source signal) may be compared directly with the sound source signals in the speech content comparator 204. Thus, according to this embodiment the first sound signal itself will be provided to the speech content comparator 204 instead of just a control signal indicating the sound source signal representing the first sound signal.

In either case, based on the signal comparison carried out by the speech content comparator 204 as already explained under the third step of the method according to FIG. 1 an output signal is determined (i.e. selected) as also already explained under the fourth step of the method according to FIG. 1.

Subsequently information about which of the provided sound source signals that is selected as the output signal is provided to the digital signal processor 205, whereby the remaining (i.e. not selected) sound source signals are suppressed relative to the output signal. Next, the digital signal processor 205 combines the output signal and the suppressed sound source signals and provides the combined signal to a digital-analogue converter (not shown for reasons of clarity) and further on to the loudspeaker 206 that provides the audio output corresponding to the combined signal.

For most embodiments the audio device system 200 will comprise more than a single microphone in order to enable beamforming, but sometimes a single microphone suffices. According to one embodiment this is the case if the selection of the first sound signal is only based on own voice recognition that does not include spatial features, and instead is only based on non-spatial features such as spectral characteristics of the user's voice.

According to an embodiment of the FIG. 2 embodiment, the digital signal processor 205 comprises a hearing loss compensation block configured to process the combined signal, whereby an improved hearing aid system is provided due to improved noise suppression as a result of the ideally noise free sound source signals provided by the sound source signal separator 202 and due to improved speech intelligibility as a result of the speech analysis that enables suppression of sound sources that the user is not paying attention to.

The methods and systems of the present invention according to the disclosed embodiments may generally be implemented in both hearing aids and in audio devices that are not hearing aids (i.e. they do not comprise means for compensating a hearing loss), but nevertheless comprise both acoustical-electrical input transducers and electro-acoustical output transducers. Such systems and devices are at present often referred to as hearables. However, a headset or earphones are other examples.

It is noted that the present invention is particularly advantageous in connection with systems that include audio devices worn at, on or in an ear and that consequently the term audio device system according to an embodiment can be replaced with the term ear level audio device system.

According to yet other variations, the audio devices need not comprise a traditional loudspeaker as output transducer. Examples of audio devices in the form of hearing aids that do not comprise a traditional loudspeaker include cochlear implants, implantable middle ear hearing devices (IMEHD), bone-anchored hearing aids (BAHA) and various other electro-mechanical transducer based solutions including e.g. systems based on using a laser diode for directly inducing vibration of the eardrum.

However, it is generally noted that even though many features of the present invention are disclosed in embodiments comprising other features then this does not imply that these features by necessity need to be combined.

As one example the methods used for selecting the first sound signal can be selected independent of the methods used for comparing the speech content of the first sound signal with the provided plurality of sound source signals.

As another example said above mentioned methods can be selected and mixed independent one whether the audio device system is a hearing aid system.

Generally, the various embodiments of the present invention may be combined unless it is explicitly stated that they cannot be combined.

The invention claimed is:

1. A method of operating an audio device system comprising the steps of:

a) providing a plurality of sound source signals each from a sound source of a present sound environment;
b) selecting a first sound signal comprising speech;
c) comparing speech content of said first sound signal with speech content of the provided plurality of sound source signals, wherein said comparing comprises:

(i) generating, by a natural language processing model, semantic and/or syntactic numerical representations of the speech content of the first sound signal and of each of the plurality of sound source signals, and
(ii) determining, by a language model, for each of the plurality of sound source signals a probability that the speech content thereof constitutes a conversational response to the speech content of the first sound signal;

d) selecting, based on said comparison, as output signal the sound source signal that most likely is part of a conversation that an audio device system user is paying attention to, wherein said selecting comprises selecting the sound source signal having the highest predicted probability of being such a conversational response and/or having a highest semantic and/or syntactic similarity with the first sound signal; and
e) providing an audio output based on said output signal, wherein the contribution to the audio output from the remaining sound source signals is suppressed compared to the contribution from the output signal.

2. The method according to claim 1, wherein the step of providing the plurality of sound source signals each from the sound source of the present sound environment comprises the further steps of:

using an encoder-decoder neural network that has been obtained by feeding a mixed audio signal comprising a plurality of speech signals and a plurality of noise signals to the neural network and subsequently train the neural network to provide only said plurality of speech signals; or using a plurality of beam formers each adapted to point in a desired direction different from other beam formers.

3. The method according to claim 2, wherein the step of using the plurality of beam formers each adapted to point in the desired direction different from the other beam formers comprises the further step of:

determining that a beam former is pointing in a desired direction if speech is detected in the beam former output signal.

4. The method according to claim 1, wherein the step of selecting the first sound signal is carried out by at least one of the steps of:

detecting a sound from a source that is positioned directly in front of the user, detecting a sound from a source that the user is looking at, detecting the audio device system user's own voice, by identifying the sound source signal that exhibits the highest similarity with an EEG signal of the user; and by subsequently carrying out at least one of the steps of:

selecting the first sound signal from at least one of said detected sounds in response to a predetermined interaction between the user and the audio device system wherein said predetermined interaction comprises at least one: making a specific head movement, tapping an audio device of the audio device system, operating an audio device control means, speaking a control word, or operating a graphical user interface of the audio device system.

5. The method according to claim 1, wherein said step of comparing the speech content of said first sound signal with the speech content of the provided plurality of sound source signals comprises at least one of:

assigning a numerical representation to at least some of the words comprised in the first sound signal and in said plurality of provided sound source signals, and providing a word embedding similarity measure in order to estimate a similarity between the first sound signal and said plurality of provided sound source signals; and determining timing of speech ending for the first sound signal and determining timing of speech onset for said plurality of provided sound source signals and subsequently identifying at least one sound source signals with speech onset within a predetermined duration after speech ending for the first sound signal;

assigning a numerical representation to at least one of syntactic and semantic information comprised in the first sound signal and in said plurality of provided sound source signals; or providing at least one of a syntactic similarity and a semantic similarity between the first sound signal and said plurality of provided sound source signals.

6. The method according to claim 1, wherein the step of selecting, based on said comparison, as the output signal the sound source signal that the audio device system user is most likely paying attention to comprises at least one of the steps of:

selecting as the output signal the sound source signal having a word embedding similarity measure that is most similar with a word embedding similarity measure of the first sound source signal;

selecting as the output signal the sound source signal having a speech onset within a predetermined duration after speech ending of the first sound signal;

selecting as the output signal the sound source signal having the highest score of at least one of the semantic similarity measure and the syntactic similarity measure; or selecting as the output signal the sound source signal having a highest combined score, wherein the combined score is obtained by combining at least some of:

the word embedding similarity measure score, the semantic similarity measure, the syntactic similarity measure, a sound pressure level score reflecting the strength of the signal, a previous participant score reflecting whether the speaker representing the sound source signal has previously participated in the conversation and having a speech onset within said predetermined duration after speech ending of the first sound signal.

7. The method according to claim 1, wherein the step of providing the audio output based on said output signal comprises at least one of the steps of:

suppressing the contribution to the audio output from the remaining sound source signals such that the combined level of the remaining sound source signals is in the range between 3 and 24 dB or between 6 and 18 dB below the output signal level; or enabling the user to control the ratio between the output signal level and the combined level of the remaining sound source signals.

8. The method according to claim 1, comprising the further steps of:

replacing the first sound signal with the output signal; and triggering that steps c), d) and e) are carried out in response to a detection of said output signal reaching a speech ending.

9. The method according to claim 1, comprising the further step of:

triggering that steps c), d) and e) are carried out in response to a detection of said output signal reaching a speech ending.

10. The method according to claim 1, wherein the first sound signal is associated with a first speaker and a sound source signal of the plurality of sound source signals is associated with a second speaker different from the first speaker.

11. The method according to claim 1, wherein said step of comparing the speech content of said first sound signal with the speech content of the provided plurality of sound source signals comprises:

assigning a numerical representation to at least some of the words comprised in the first sound signal and in said plurality of provided sound source signals, and providing a word embedding similarity measure in order to estimate a similarity between the first sound signal and said plurality of provided sound source signals; and determining timing of speech ending for the first sound signal and determining timing of speech onset for said plurality of provided sound source signals and subsequently identifying at least one sound source signals with speech onset within a predetermined duration after speech ending for the first sound signal;

assigning a numerical representation to at least one of syntactic and semantic information comprised in the first sound signal and in said plurality of provided sound source signals; and providing at least one of a syntactic similarity and a semantic similarity between the first sound signal and said plurality of provided sound source signals.

12. The method according to claim 1, wherein the step of providing the audio output based on said output signal comprises the steps of:

suppressing the contribution to the audio output from the remaining sound source signals such that the combined level of the remaining sound source signals is in the range between 3 and 24 dB or between 6 and 18 dB below the output signal level; and enabling the user to control the ratio between the output signal level and the combined level of the remaining sound source signals.

13. An audio device system comprising at least one audio device, wherein said at least one audio device comprises an acoustical-electrical input transducer and an electrical-acoustical output transducer, and wherein said audio device system further comprises a sound source signal separator adapted to receive an input signal from said acoustical-electrical input transducer and to provide a plurality of sound source signals each representing a sound source of a present sound environment;

a first sound signal selector adapted to enable a user to select a first sound signal comprising speech, wherein said first sound signal is based on said audio input signal;

a speech content comparator adapted to compare the speech content of said first sound signal with the speech content of the provided plurality of sound source signals, and adapted to select, based on said comparison, as output signal the sound source signal that most likely is part of a conversation that the audio device system user is paying attention to, wherein said comparing comprises:

(i) generating, by a natural language processing model, semantic and/or syntactic numerical representations of the speech content of the first sound signal and of each of the plurality of sound source signals, and (ii) determining, by a language model, for each of the plurality of sound source signals a probability that the speech content thereof constitutes a conversational response to the speech content of the first sound signal, and wherein said selecting comprises selecting the sound source signal having the highest predicted probability of being such a conversational response and/or having a highest semantic and/or syntactic similarity with the first sound signal; and a digital signal processor adapted to process the output signal, such that the contribution to the audio output from the remaining sound source signals is suppressed compared to the contribution from the output signal; wherein said processed output signal is provided to the electrical-acoustical output transducer in order to provide the audio output, and wherein the acoustical-electrical input transducer provides an input signal representing the present sound environment and provides the input signal to the sound source signal separator and to the first sound signal selector.

* * * * *